(12) United States Patent
Paasikallio et al.

(10) Patent No.: US 11,939,531 B2
(45) Date of Patent: Mar. 26, 2024

(54) ALKALI-ENHANCED HYDROTHERMAL PURIFICATION OF PLASTIC PYROLYSIS OILS

(71) Applicant: Neste Oyj, Espoo (FI)

(72) Inventors: Ville Paasikallio, Porvoo (FI); Jukka-Pekka Pasanen, Porvoo (FI); Blanka Toukoniitty, Porvoo (FI)

(73) Assignee: NESTE OYJ, Espoo (FI)

( * ) Notice: Subject to any disclaimer, the term of this patent is extended or adjusted under 35 U.S.C. 154(b) by 78 days.

(21) Appl. No.: 17/613,812

(22) PCT Filed: May 26, 2020

(86) PCT No.: PCT/EP2020/064512
§ 371 (c)(1),
(2) Date: Nov. 23, 2021

(87) PCT Pub. No.: WO2020/239729
PCT Pub. Date: Dec. 3, 2020

(65) Prior Publication Data
US 2022/0235276 A1    Jul. 28, 2022

(30) Foreign Application Priority Data
May 28, 2019   (FI) ...................................... 20195446

(51) Int. Cl.
| | |
|---|---|
| *C10G 1/10* | (2006.01) |
| *B01D 11/04* | (2006.01) |
| *C10G 1/00* | (2006.01) |
| *C10G 1/04* | (2006.01) |
| *C10G 3/00* | (2006.01) |
| *C10G 19/02* | (2006.01) |
| *C10G 31/08* | (2006.01) |
| *C10L 1/04* | (2006.01) |

(52) U.S. Cl.
CPC ................ *C10G 1/10* (2013.01); *B01D 11/04* (2013.01); *C10G 1/002* (2013.01); *C10G 1/047* (2013.01); *C10G 3/40* (2013.01); *C10G 3/50* (2013.01); *C10G 19/02* (2013.01); *C10G 31/08* (2013.01); *C10L 1/04* (2013.01); *C10G 2300/1007* (2013.01)

(58) Field of Classification Search
CPC . C10G 1/002; C10G 1/10; C10G 3/40; C10G 3/50; C10G 19/02; C10G 31/08; C10G 2300/1007
See application file for complete search history.

(56) References Cited

U.S. PATENT DOCUMENTS

| | | | |
|---|---|---|---|
| 3,773,654 A * | 11/1973 | Rausch ................. | C10G 45/00 208/143 |
| 4,566,965 A | 1/1986 | Olmstead | |
| 5,608,136 A * | 3/1997 | Maezawa ................ | C10G 1/10 588/317 |
| 11,427,782 B2 | 8/2022 | Toukoniitty et al. | |
| 2009/0062581 A1 | 3/2009 | Appel et al. | |
| 2011/0315600 A1 | 12/2011 | Choi et al. | |
| 2016/0214028 A1 | 7/2016 | Coppola et al. | |
| 2017/0009143 A1 | 1/2017 | Urade et al. | |
| 2019/0299491 A1* | 10/2019 | Stanislaus ............... | C10B 53/07 |
| 2021/0277324 A1 | 9/2021 | Toukoniitty et al. | |

FOREIGN PATENT DOCUMENTS

| | | |
|---|---|---|
| CN | 103589454 A | 2/2014 |
| CN | 105940087 A | 9/2016 |
| CN | 112534030 A | 3/2021 |
| JP | 2003034794 A | 2/2003 |
| JP | 2018507287 A | 3/2018 |
| WO | 2014001632 A1 | 1/2014 |
| WO | 2015114008 A1 | 8/2015 |
| WO | 2017088015 A1 | 6/2017 |
| WO | 2020016400 A1 | 1/2020 |

OTHER PUBLICATIONS

International Search Report (PCT/ISA/210) and Written Opinion (PCT/ISA/237) dated Jul. 22, 2020, by the European Patent Office as the International Searching Authority for International Application No. PCT/EP2020/064512.

Uzoejinwa, Benjamin Bernard, et al., "Co-pyrolysis of biomass and waste plastics as a thermochemical conversion technology for high-grade biofuel production: Recent progress and future directions elsewhere worldwide", Energy Conversion and Management, 2018, 163, pp. 468-492.

Office Action dated Apr. 13, 2022, by the Indian Patent Office in corresponding Indian Patent Application No. 202117053887. (6 pages).

Office Action dated Jan. 10, 2023, by the Japanese Patent Office in corresponding Japanese Patent Application No. 2021-569285, and an English Translation of the Office Action. (5 pages).

\* cited by examiner

*Primary Examiner* — Randy Boyer
(74) *Attorney, Agent, or Firm* — BUCHANAN INGERSOLL & ROONEY PC

(57) ABSTRACT

A method is disclosed for preparing fuel components from waste pyrolysis oil. Exemplary embodiments include providing a waste pyrolysis oil having plastic pyrolysis oil and/or tyre pyrolysis oil, and impurities; purifying the waste pyrolysis oil by hydrothermal treatment with water or alkaline water; separating the hydrothermally treated waste pyrolysis oil from an aqueous phase; preparing a hydroprocessing feed from the hydrothermally treated waste pyrolysis oil; hydroprocessing the hydroprocessing feed catalytically with hydrogen to cause hydrogenation; and recovering a hydrocarbon fraction boiling in a liquid fuel range.

24 Claims, No Drawings

ALKALI-ENHANCED HYDROTHERMAL PURIFICATION OF PLASTIC PYROLYSIS OILS

FIELD OF THE INVENTION

The present invention relates to a method for preparing fuel components from waste pyrolysis oil (WPO).

BACKGROUND OF THE INVENTION

There is an increasing demand to find more sustainable refinery feedstocks. Co-processing renewable or recycled-type raw materials in existing refinery units along with traditional fossil feeds or even retro-fitting existing units to process solely these new raw materials is therefore gaining increasing attention.

Recycled-type raw materials or reduced-carbon feedstocks are feeds created by the processing of fossil-based wastes, like waste plastics or end-of-life tires. The attractive feature of these raw materials from the viewpoint of the refinery is that they largely represent the traditional refinery feeds in that they contain only small amount of oxygen and are composed of hydrocarbons.

Waste pyrolysis oil (WPO) is not a common feedstock as refinery stream in a hydrotreatment process. It is substantially different in composition from a feedstock based on oils and fatty acids components of plant origin, and hydrotreatment reactors in prior art in general do not have capacity to handle a feedstock having the properties of waste pyrolysis oil. Waste pyrolysis oils, such as plastic pyrolysis oils, contain different elemental impurities dependent mostly on the original raw material, but also on the pyrolysis technology employed. The three most relevant impurities in waste pyrolysis oils are nitrogen, sulphur, and chlorine, which have a detrimental effect on the utilization of the pyrolysis oil. These impurities are primarily present in organic form, which means that they are structurally associated with hydrocarbon chains of varying size and complexity. Efficient removal of organic impurities like chlorinated hydrocarbons is not possible using simple means like water washing or adsorption. Removal of compounds such as these necessitates the use of a reactive approach that liberates chlorine in a form that readily separates from the pyrolysis oil. One such form is hydrogen chlorine (HCl), which is generated when chlorinated hydrocarbons are catalytically hydrotreated. This sort of catalytic processing requires otherwise low elemental impurities in order to avoid catalyst deactivation, which can be problematic for processing complex materials such as plastic pyrolysis oils.

Specifically, the hydrotreatment of the hydrocarbon chains comprising nitrogen, sulphur, and chlorine will result in the production of HCl, $NH_3$, and $H_2S$. After cooling of the hydrotreated product, the HCl produced may be corrosive for the inlet pipe for the hydrotreatment reaction if it meets contact with water. The HCl may also react with the $NH_3$ and produce $NH_4Cl$, which may plug the catalyst bed. $NH_4Cl$ can also lead to fouling of heat exchangers.

Consequently, a different technology is required to prepare WPO as feedstock for refinery, and there is a pressing need to develop efficient and robust purification methods that can eliminate contaminants such as chlorinated hydrocarbons prior to subjecting a feedstock to hydrotreatment.

The prior art teaches, in general, four different concepts for processing plastic pyrolysis oil in a refinery setting which each of them aims at solving the challenge of removing harmful element impurities, in particular halogens, such as chlorine and bromine, but sometimes also nitrogen and sulphur, prior to the hydrotreatment:

Removal of the harmful impurities through sorting of the solid plastic raw material;

Removal of the harmful impurities during the pyrolysis most often using the so-called pre-cracking;

Removal of the harmful impurities in a dedicated hydrotreatment unit;

Removal of the harmful impurities using a pre-treatment step for the liquid pyrolysis oil prior to conventional refinery hydrotreatment.

The present invention is based on the principles of the last-mentioned of these concepts, but the solution according to the invention is different from the teaching of that concept in prior art. In particular, the literature disclosing removal of impurities from plastic pyrolysis oil is sparse, and it does not discuss plastic pyrolysis oil pre-treatment prior to refinery units for hydrotreatment.

WO 2017088015 A1 discloses a liquid-liquid extraction, a purification methods that are specified to be used for plastic pyrolysis oils.

US 2016/0264874 A1 discloses catalytic hydrotreatment of plastic pyrolysis oils.

U.S. Pat. No. 7,955,498 B2 discloses a method for reducing halide concentration in a hydrocarbon product having an organic halide content that is made by a hydrocarbon conversion process using a halogen containing acidic ionic liquid catalyst The object of the invention is to provide a method for removal of harmful impurities, in particular chlorine and nitrogen, in waste pyrolysis oil prior to conventional refinery hydrotreatment.

Another object is to provide a less complex pre-treatment step that removes the impurities prior to the refinery hydrotreatment without the use of heterogeneous catalysts and external hydrogen.

Yet another object is to provide a waste pyrolysis oil that can be used in existing hydrotreatment units for preparing fuel components.

These objects are fulfilled with the method of the present invention.

SUMMARY OF THE INVENTION

Accordingly, the present invention provides a method for preparing fuel components from waste pyrolysis oil (WPO), comprising:

a) providing a waste pyrolysis oil, comprising as the major part, such as at least 75 wt %, plastic pyrolysis oil (PPO) and/or tyre pyrolysis oil (TPO), the waste pyrolysis oil comprising as the major part hydrocarbons, and comprising impurities in the form of:

chlorine compounds, comprising at least 20 mg/kg chlorine of the WPO and optionally up to 3500 mg/kg, nitrogen compounds, comprising at least 50 mg/kg nitrogen of the WPO and optionally up to 10,000 mg/kg, sulphur compounds, comprising at least 10 mg/kg sulphur of the WPO and optionally up to 15,000 mg/kg;

b) purifying the waste pyrolysis oil by subjecting it to a hydrothermal treatment with water or with water having a pH above 7 at 150-450° C., where the oil to water ratio is from 9:1 to 1:9 (weight/weight), such as from 4:1 to 1:1;

c) separating the hydrothermally treated waste pyrolysis oil from the aqueous phase;
d) preparing a hydroprocessing feed
   consisting essentially of the hydrothermally treated waste pyrolysis oil; or
   consisting essentially of a mixture of the hydrothermally treated waste pyrolysis oil and one or more feed(s) selected from the list consisting of oxygen-containing biological oils having less than 50 mg/kg chlorine and less than 1 mg/kg silicon and hydrocarbons having less than 50 mg/kg chlorine and less than 1 mg/kg silicon;
e) hydroprocessing the hydroprocessing feed catalytically with hydrogen to cause hydrogenation, and optionally one or more of hydrodeoxygenation (HDO), hydrodesulfurisation (HDS), hydrodenitrification (HDN), hydrodechlorination (HDCl), hydrodearomatization (HDAr), and hydroisomerisation (HI), at a temperature between 200 and 450° C., and at a pressure between 1 MPa and 25 MPa;
f) recovering from the hydroprocessed product at least one hydrocarbon fraction boiling in the liquid fuel range.

Thus, the present invention combines a hydrolysis step prior to hydrotreatment and a hydrotreatment step in existing hydrotreatment equipment. According to the invention, waste pyrolysis oil is pre-treated by heating to temperatures of 150 to 450° C. in the presence of water or an aqueous solution having a pH of more than 7. By the present invention, it is possible to at least partially remove organic chlorine and other elemental impurities from the waste pyrolysis oils without using heterogeneous catalysts and external hydrogen. Although this purified waste pyrolysis oil is not yet a ready fuel component, there are less impurities left that would need to be removed using other means. Thus, this purification method essentially improves the usability of waste pyrolysis oils, such as plastic pyrolysis oil (PPO) and tyre pyrolysis oil (TPO), for e.g. existing refinery hydrotreatment units. In theory, waste pyrolysis oils which prior to hydrotreatment have been purified using the method according to the invention could be fed into refinery hydrotreatment units utilizing higher blends than what would be possible if the purification had not been carried out prior to feeding the feedstock to the hydrotreatment reactor.

The reaction may be carried out in a pressurized system that includes mixing. After a certain reaction time, the mixture may be cooled, and the oil and aqueous phases separated by for example centrifugation. It is presumed that chlorine is released in the form of HCl, which is subsequently neutralized by the basic component, e.g. NaOH, if present in the aqueous solution. Consequently, the pH of the aqueous solution decreases during the reaction. Compared to the original plastic pyrolysis oil, the pyrolysis, which has been treated in this manner, has lower contents of chlorine, nitrogen, and sulphur, and in some embodiments it may also have lower contents of bromine and silicon. In some embodiments, a solid precipitate is also formed. It is therefore plausible that impurities that are removed from the pyrolysis oil are transferred to both the aqueous phase and the precipitate.

Compared to the hydrotreatment approach in prior art, the process of the invention is much less complex as it requires no hydrogen or catalyst, and besides removing chlorine, nitrogen, and sulphur, it may also remove bromine and silicon in some embodiments.

Thus, in one preferred embodiment of the method of the invention, the WPO may further comprise impurities in the form of silicon compounds, comprising at least 20 mg/kg silicon of the WPO, and/or impurities in the form of bromine compounds, comprising at least 10 mg/kg bromine of the WPO. In particular, it is surprising that silicon can also be removed by the present method, and this broadens the application field of the waste pyrolysis oil.

Some Definitions

Hydroprocessing Feed

In the context of the present invention, the hydroprocessing feed may comprise oxygen-containing biological oils in mixture with the hydrothermally treated waste pyrolysis oil deriving from plastic pyrolysis oil (PPO) and/or tyre pyrolysis oil (TPO) as defined in the claims. Oxygen-containing biological oils are typically free fatty acids and fatty acid derivatives, such as esters, e.g. glycerides, amides, alcohols, anhydrides, metal salts, or mixtures thereof, the fatty acids having 4 or more carbon atoms, such as from 4 to 24 carbon atoms, and the fatty acid may be saturated or unsaturated.

Hydroprocessing

In the context of the present invention, hydroprocessing is a catalytic treatment causing hydrogenation of the hydrocarbons in the feed and, optionally, one more of the processes as defined in the claims, and which adds hydrogen to and/or remove oxygen, sulphur, nitrogen, chlorine, and/or aromatics from the hydrocarbons in the feed, and/or causes hydroisomerisation thereof.

DETAILED DESCRIPTION OF THE INVENTION

In describing the embodiments of the invention, specific terminology will be resorted to for the sake of clarity. However, the invention is not intended to be limited to the specific terms so selected, and it is understood that each specific term includes all technical equivalents that operate in a similar manner to accomplish a similar purpose.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and comprises herein are intended by the inventors to be optionally substitutable with the terms "consisting of", "consist of" and "consists of", respectively, in every instance.

According to the method of the invention, the WPO comprises as a major part PPO and/or TPO that comprises hydrocarbons as their major part. The major part constitutes for example at least 75 wt % PPO and/or TPO in the WPO, such as at least 80 wt %, e.g. at least 85 wt %, at least 90 wt %, at least 95 wt %, or at least 98 wt %. The hydrocarbons constitute for example at least 75 wt % of the WPO, such as at least 80 wt %, e.g. at least 85 wt %, at least 90 wt %, at least 95 wt %, or at least 98 wt % of the WPO.

The impurities in the WPO in the form of chlorine compounds constitute at least 20 mg/kg chlorine of the WPO, such as at least 50 mg/kg, e.g. at least 100 mg/kg, at least 200 mg/kg, at least 300 mg/kg, at least 400 mg/kg, at least 500 mg/kg, at least 1000 mg/kg, at least 1500 mg/kg, at least 2000 mg/kg, at least 2500 mg/kg, at least 3000 mg/kg, and up to 3500 mg/kg.

The impurities in the WPO in the form of nitrogen compounds constitute at least 50 mg/kg nitrogen of the WPO, e.g. at least 100 mg/kg, at least 200 mg/kg, at least 300 mg/kg, at least 400 mg/kg, at least 500 mg/kg, at least 1000 mg/kg, at least 2000 mg/kg, at least 3000 mg/kg, at least 5000 mg/kg, at least 7000 mg/kg, and up to 10,000 mg/kg.

The impurities in the WPO in the form of sulphur compounds constitute at least 10 mg/kg sulphur of the WPO, such as at least 20 mg/kg, e.g. at least 50 mg/kg, at least 100 mg/kg, at least 200 mg/kg, at least 300 mg/kg, at least 400 mg/kg, at least 500 mg/kg, at least 1000 mg/kg, at least 2000 mg/kg, at least 3000 mg/kg, at least 5000 mg/kg, at least 7000 mg/kg, at least 10,000 mg/kg, and up to 15,000 mg/kg.

During the hydrothermal treatment, the pH in the water may be adjusted to above 7 be adding any convenient base, such as NaOH, KOH, LiOH, $Ca(OH)_2$, $Mg(OH)_2$, $Ba(OH)_2$, preferably NaOH.

During the hydrothermal treatment, the temperature is from 150 to 450° C., such as from 175 to 425° C., e.g. from 200 to 400° C., from 225 to 375° C., from 250 to 350° C., from 275 to 325° C., or from 250 to 300° C.

During the hydrothermal treatment, the oil to water ratio (weight/weight) is from 9:1 to 1:9, such as from 4:1 to 1:1, e.g. 2:1.

In a first embodiment of the method of the invention, the WPO may further comprise impurities in the form of silicon compounds, comprising at least 20 mg/kg silicon of the WPO, such as at least 30 mg/kg, at least 40 mg/kg, at least 50 mg/kg, at least 60 mg/kg, at least 70 mg/kg, at least 80 mg/kg, at least 90 mg/kg, at least 100 mg/kg, at least 150 mg/kg, at least 200 mg/kg, at least 300 mg/kg, at least 400 mg/kg, at least 500 mg/kg, at least 600 mg/kg, at least 700 mg/kg, at least 800 mg/kg, at least 900 mg/kg, at least 100 mg/kg, at least 1500 mg/kg, and up to 2000 mg/kg; and/or impurities in the form of bromine compounds, comprising at least 10 mg/kg bromine of the WPO, such as at least 20 mg/kg, at least 30 mg/kg, at least 40 mg/kg, at least 50 mg/kg, at least 60 mg/kg, at least 70 mg/kg, at least 80 mg/kg, at least 90 mg/kg, at least 100 mg/kg, at least 150 mg/kg, at least 200 mg/kg, at least 300 mg/kg, at least 400 mg/kg, at least 500 mg/kg, at least 600 mg/kg, at least 700 mg/kg, at least 800 mg/kg, at least 900 mg/kg, at least 1000 mg/kg, at least 1500 mg/kg, and up to 2000 mg/kg.

In any of the embodiments of the invention, the WPO may further comprise impurities in the form of silicon compounds, comprising at least 20 mg/kg silicon and up to 2000 mg/kg, and the hydrothermal treatment in step b) may be conducted so as to cause at least a 50% reduction of silicon compounds of the waste pyrolysis oil and/or at least a 50% reduction of chlorine compounds, optionally whereby the silicon in the hydrothermally treated waste pyrolysis oil are below 20 mg/kg, and/or whereby the oxygen in the hydrothermally treated waste pyrolysis oil are above 20 mg/kg.

In any of the embodiments of the invention, the water used in step b) having a pH above 7 may contain one or more cations selected from the list consisting of: alkali metals, such as Li, Na, K, Rb, Cs, and alkaline earth metals, such as Mg, Ca, Sr, and Ba.

In any of the embodiments of the invention, the hydroprocessing feed may consist essentially of a mixture of the hydrothermally treated waste pyrolysis oil and one or more of the list consisting of: oxygen-containing biological oils having less than 50 mg/kg chlorine and less than 1 mg/kg silicon and hydrocarbons having less than 5 mg/kg chlorine and less than 1 mg/kg silicon.

In any of the embodiments of the invention, the hydroprocessing feed may consist essentially of a mixture of the hydrothermally treated waste pyrolysis oil, oxygen-containing biological oils having less than 50 mg/kg chlorine and less than 1 mg/kg silicon, and hydrocarbons having less than 5 mg/kg chlorine and less than 1 mg/kg silicon.

In any of the embodiments of the invention, the hydroprocessing feed may consist essentially of a mixture of:
- 1-100 wt % of the hydrothermally treated waste pyrolysis oil, such as 5, 10, 20, 30, 40, 50, 60, 70, 80, 90, or 95 wt %;
- 0-40 wt % of the oxygen-containing biological oils having less than 50 mg/kg chlorine and less than 1 mg/kg silicon, such as 1-30 wt %, e.g. 5-25 wt %, or 10-20 wt %; and
- 0-99 wt % of the hydrocarbons, such as 2, 5, 10, 15, 20, 25, 30, 35, 40, 50, 60, 70, 80, 90, or 95 wt %, having less than 5 mg/kg chlorine and less than 1 mg/kg silicon.

In any of the embodiments of the invention, the hydroprocessing feed may consist essentially of a mixture of:
- 1-10 wt % of the hydrothermally treated waste pyrolysis oil, such as 2, 3, 4, 5, 6, 7, 8, 9, or 10 wt %;
- 1-40 wt % of the oxygen-containing biological oils having less than 50 mg/kg chlorine and less than 1 mg/kg silicon, such as 5-30 wt %, e.g. 10-25 wt %, or 15-20 wt %; and
- 50-98 wt % of the hydrocarbons, such as 55-95 wt %, e.g. 60-90 wt %, or 70-80 wt %, having less than 5 mg/kg chlorine and less than 1 mg/kg silicon.

In any of the embodiments of the invention, in step d) at least 80 wt % of the hydrocarbons having less than 5 mg/kg chlorine and less than 1 mg/kg silicon, such as at least 85 wt %, e.g. at least 90 wt % or at least 95 wt %, may be recycled product obtained from step f).

In any of the embodiments of the invention, in step d) the hydrocarbons having less than 5 mg/kg chlorine and less than 1 mg/kg silicon may further also have less than 1 wt % olefins.

In any of the embodiments of the invention, in step f) the at least one hydrocarbon fraction boiling in the liquid fuel range may be diesel and/or gasoline and/or naphtha.

In any of the embodiments of the invention, in step e) the hydroprocessing may be conducted in a fixed bed reactor.

In any of the embodiments of the invention, the hydroprocessing reaction conditions may comprise a temperature in the range from 270 to 390° C., such as 280° C., 290° C., 300° C., 310° C., 320° C., 330° C., 340° C., 350° C., 360° C., 370° C., or 380° C., depending of the nature of the hydrocarbon and the biological oil in the mixture, a pressure in the range from 2 to 8 MPa, and a WHSV in the range from 0.1-10 $h^{-1}$, preferably from 0.5 to 5 $h^{-1}$, and a $H_2$ flow of 50 to 2000 nl $H_2$/l feed, preferably from 100 to 900 nl $H_2$/l feed, in the presence of a hydrodeoxygenation catalyst, such as NiMo on an alumina support.

In any of the embodiments of the invention, the hydroprocessing reaction conditions may comprise conditions suitable for isomerisation, which reaction conditions comprise a temperature in the range from 250 to 450° C., such as 300 to 400° C., a pressure in the range from 1 to 6 MPa, such as 2 to 5 MPa, and a WHSV in the range from 0.1 to 10 $h^{-1}$, preferably from 0.5 to 5 $h^{-1}$, more preferably from 0.5 to 3 $h^{-1}$, and a $H_2$ flow of from 50 to 2000 nl $H_2$/l feed, preferably from 100 to 900 nl $H_2$/l feed, more preferably from 100 to 800 nl $H_2$/l feed, in the presence of an isomerisation catalyst, such as a catalyst comprising a Group VIII metal and a molecular sieve, optionally on an alumina and/or silica support.

EXAMPLES

Example 1

High Temperature NaOH Treatment of Waste Plastic Pyrolysis Oil Naphtha Fraction

The following experiment was carried out in a 1-litre batch autoclave reactor. A distilled naphtha fraction (5-95 wt % distillation range 85-174° C.) derived from waste plastic pyrolysis oil (340 g) and the 2 wt % aqueous NaOH (227 g) were weighed together into the reactor vessel. After sealing and pressure testing, the reactor that was stirred at 500 rpm was heated to the desired reaction temperature of 240° C., which was then maintained for 30 min. The reactor was subsequently cooled down to room temperature before recovery of products. The contents were decanted from the reactor vessel into centrifugation tubes, and the liquids were centrifuged at 20° C. and 4300 rpm for 30 minutes. After the centrifugation, the purified pyrolysis oil was recovered as a separate layer, and analysed for its Cl, Br, S, and N content. Cl, Br, and S content was determined using X-ray fluorescence spectroscopy, and N content was determined according to standard ASTM D 5762. The results, which are presented in Table 1, show that the content of both Cl and Br is reduced by more than 90%.

TABLE 1

Impurity content of waste plastic pyrolysis oil naphtha fraction before and after 30 min treatment with 2 wt-% aqueous sodium hydroxide at 240° C.

| | Original waste plastic pyrolysis oil naphtha fraction | Purified waste plastic pyrolysis oil naphtha fraction | Decrease (%) |
| --- | --- | --- | --- |
| N (mg/kg) | 500 | 25 | 95 |
| Cl (mg/kg) | 590 | 36 | 94 |
| Br (mg/kg) | 213 | 7 | 97 |
| S (mg/kg) | 89 | 80 | 10 |

Example 2

High Temperature NaOH Treatment of Waste Plastic Pyrolysis Oil Naphtha Fraction

The following experiment was carried out in a 1-litre batch autoclave reactor. A distilled naphtha fraction (5-95 wt % distillation range 85-174° C.) derived from waste plastic pyrolysis oil (340 g) (obtained commercially from Ecomation) and the 2 wt % aqueous NaOH (227 g) were weighed together into the reactor vessel. After sealing and pressure testing, the reactor that was stirred at 500 rpm was heated to the desired reaction temperature of 240° C., which was then maintained for 30 min. The reactor was subsequently cooled down to room temperature before recovery of products. The contents were decanted from the reactor vessel into centrifugation tubes, and the liquids were centrifuged at 20° C. and 4300 rpm for 30 minutes. After the centrifugation, the purified pyrolysis oil was recovered as a separate layer, and analysed for its Cl, Br, S, N and Si content. Cl, Br, and S content was determined using X-ray fluorescence spectroscopy, and N content was determined according to standard ASTMD5762. The silicon content was analysed using inductively coupled plasma mass spectrometry. The results, which are presented in Table 2, clearly show that the content of Cl, Br and Si decreased by more than 90%.

TABLE 2

Impurity content of waste plastic pyrolysis oil naphtha fraction before and after 30 min treatment with 2 wt-% aqueous sodium hydroxide at 240° C.

| | Original waste plastic pyrolysis oil naphtha fraction | Purified waste plastic pyrolysis oil naphtha fraction | Decrease (%) |
| --- | --- | --- | --- |
| N (mg/kg) | 500 | 65 | 87 |
| Cl (mg/kg) | 590 | 28 | 95 |
| Br (mg/kg) | 213 | 7 | 97 |
| S (mg/kg) | 89 | 87 | 2 |
| Si (mg/kg) | 230 | 2 | 99 |

Example 3

Solvent Extraction of Waste Plastic Pyrolysis Oil Middle Distillate Fraction

In this example, impurities were removed from a waste plastic pyrolysis oil middle distillate fraction (5-95 wt % distillation range 172-342° C.) using solvent extraction with N-methyl-2-pyrrolidone (NMP). The waste plastic pyrolysis oil (100 g) was first mixed with NMP containing 2 wt % water (196 g NMP, 4 g water) in a glass separation funnel at ambient temperature. After mixing, the raffinate and extract were allowed to separate. The raffinate, which in this case represents the purified waste plastic pyrolysis oil, was subjected to the same extraction treatment two more times (3 extraction steps in total). After the third extraction step, the raffinate was washed with water at ambient temperature in a glass separation funnel using a water-to-oil ratio of 2:1 (w/w). The water-washed raffinate, i.e. the purified pyrolysis oil middle distillate fraction, was analysed for its Cl, Br, S and N content. Cl, Br and S content was determined using X-ray fluorescence spectroscopy, and N content was determined according to standard ASTM D 5762. The results in Table 3 show Cl and Br content were both reduced by more than 90% as a result of the solvent extraction treatment.

TABLE 3

Impurity content of waste plastic pyrolysis oil middle distillate fraction before and after solvent extraction with N-methyl-2-pyrrolidone and water washing.

| | Original waste plastic pyrolysis oil middle distillate fraction | Purified waste plastic pyrolysis oil middle distillate fraction | Decrease (%) |
| --- | --- | --- | --- |
| N (mg/kg) | 810 | 24 | 97 |
| Cl (mg/kg) | 590 | 40 | 93 |
| Br (mg/kg) | 325 | 14 | 96 |
| S (mg/kg) | 695 | 35 | 95 |

The invention claimed is:

1. A method for preparing fuel components from waste pyrolysis oil (WPO), the method comprising:
   a) providing a waste pyrolysis oil, containing as a major part, plastic pyrolysis oil (PPO), tyre pyrolysis oil (TPO), or mixtures thereof, the waste pyrolysis oil including as the major part hydrocarbons, and including impurities formed as:

chlorine compounds, containing from 20 mg/kg chlorine of the WPO to 3500 mg/kg chlorine of the WPO;

nitrogen compounds, containing from 50 mg/kg nitrogen of the WPO to 10,000 mg/kg nitrogen of the WPO;

sulphur compounds, containing from 10 mg/kg sulphur of the WPO to 15,000 mg/kg sulphur of the WPO;

silicon compounds, containing from 20 mg/kg silicon of the WPO to 2000 mg/kg silicon of the WPO;

b) purifying the waste pyrolysis oil by subjecting it to a hydrothermal treatment with water or with water having a pH above 7 at 150-450° C., where an oil to water ratio is from 9:1 to 1:9 (weight/weight);

c) separating the hydrothermally treated waste pyrolysis oil from an aqueous phase;

d) preparing a hydroprocessing feed consisting essentially of the hydrothermally treated waste pyrolysis oil; or consisting essentially of a mixture of the hydrothermally treated waste pyrolysis oil and one or more feed(s) selected from a list consisting of oxygen-containing biological oils having less than 50 mg/kg chlorine and less than 1 mg/kg silicon and hydrocarbons having less than 50 mg/kg chlorine and less than 1 mg/kg silicon;

e) hydroprocessing the hydroprocessing feed catalytically with hydrogen to cause hydrogenation, and/or one or more of: hydrodeoxygenation (HDO), hydrodesulfurisation (HDS), hydrodenitrification (HDN), hydrodechlorination (HDCl), hydrodearomatization (HDAr), and hydroisomerisation (HI), at a temperature between 270° C. and 390° C., at a pressure between 2 MPa and 8 MPa, at a WHSV in a range from 0.1 h$^{-1}$ to 10 h$^{-1}$, and a H$_2$ flow of 50-2000 nl H$_2$/l feed in a presence of a hydrodeoxygenation catalyst; and f) recovering from a hydroprocessed product at least one hydrocarbon fraction boiling in a liquid fuel range;

wherein in step b) the hydrothermal treatment is conducted so as to cause at least a 50% reduction of silicon compounds of the WPO.

2. The method according to claim 1, wherein the WPO comprises: impurities formed as bromine compounds, containing from 10 mg/kg bromine of the WPO to 2000 mg/kg bromine of the WPO.

3. The method according to claim 1, wherein in step b) the hydrothermal treatment is conducted so as to cause at least a 50% reduction of chlorine compounds of the WPO, optionally where silicon in the hydrothermally treated WPO are below 20 mg/kg, and/or where oxygen in the hydrothermally treated WPO is above 20 mg/kg.

4. The method according to claim 1, wherein in step b) water having a pH above 7 contains one or more cations selected from a list consisting of: alkali metals and alkaline earth metals.

5. The method according to claim 1, wherein the hydroprocessing feed consists essentially of:

a mixture of the hydrothermally treated waste pyrolysis oil and one or more feed(s) selected from a list consisting of oxygen-containing biological oils having less than 50 mg/kg chlorine and less than 1 mg/kg silicon and hydrocarbons having less than 50 mg/kg chlorine and less than 1 mg/kg silicon.

6. The method according to claim 1, wherein the hydroprocessing feed consists essentially of:

a mixture of the hydrothermally treated waste pyrolysis oil, oxygen-containing biological oils having less than 50 mg/kg chlorine and less than 1 mg/kg silicon, and hydrocarbons having less than 50 mg/kg chlorine and less than 1 mg/kg silicon.

7. The method according to claim 1, wherein the hydroprocessing feed consists essentially of a mixture of:

1-100 wt % of hydrothermally treated waste pyrolysis oil, 0-40 wt % of the oxygen-containing biological oils having less than 50 mg/kg chlorine and less than 1 mg/kg silicon; and 0-99 wt % of hydrocarbons having less than 50 mg/kg chlorine and less than 1 mg/kg silicon.

8. The method according to claim 1, wherein the hydroprocessing feed consists essentially of a mixture of:

1-10 wt % of the hydrothermally treated waste pyrolysis oil;

1-40 wt % of the oxygen-containing biological oils having less than 50 mg/kg chlorine and less than 1 mg/kg silicon; and 50-98 wt % of the hydrocarbons having less than 50 mg/kg chlorine and less than 1 mg/kg silicon.

9. The method according to claim 1, wherein in step d) at least 80 wt % of the hydrocarbons having less than 50 mg/kg chlorine and less than 1 mg/kg silicon are recycled product obtained from step f).

10. The method according to claim 1, wherein in step d) the hydrocarbons having less than 50 mg/kg chlorine and less than 1 mg/kg silicon also have less than 1 wt % olefins.

11. The method according to claim 1, wherein in step f) the at least one hydrocarbon fraction boiling in the liquid fuel range is diesel and/or gasoline and/or naphtha.

12. The method according to claim 1, wherein in step e) the hydroprocessing is conducted in a fixed bed reactor.

13. The method according to claim 1, wherein the hydroprocessing reaction conditions comprise:

a temperature in a range from 280° C. to 380° C., a WHSV in a range from 0.5 h$^{-1}$ to 5 h$^{-1}$, and a H$_2$ flow of 100-900 nl H$_2$/l feed.

14. The method according to claim 13, wherein
the hydrodeoxygenation catalyst includes NiMo on an alumina support.

15. The method according to claim 1, wherein the hydroprocessing reaction conditions comprise:

conditions suitable for isomerisation, which reaction conditions include a pressure in a range from 2 MPa to 6 MPa, in a presence of an isomerisation catalyst, and/or a catalyst containing a Group VIII metal and a molecular sieve, and/or on an alumina and/or silica support.

16. The method according to claim 2, wherein in step b) the hydrothermal treatment is conducted so as to cause at least a 50% reduction of chlorine compounds of the WPO, and/or where silicon in the hydrothermally treated WPO are below 20 mg/kg, and/or where oxygen in the hydrothermally treated WPO is above 20 mg/kg.

17. The method according to claim 16, wherein in step b) water having a pH above 7 contains one or more cations selected from a list consisting of: alkali metals and alkaline earth metals.

18. The method according to claim 17, wherein the hydroprocessing feed consists essentially of:

a mixture of the hydrothermally treated waste pyrolysis oil and one or more feed(s) selected from a list consisting of oxygen-containing biological oils having less than 50 mg/kg chlorine and less than 1 mg/kg silicon and hydrocarbons having less than 50 mg/kg chlorine and less than 1 mg/kg silicon.

19. The method according to claim 18, wherein the hydroprocessing feed consists essentially of:
- a mixture of the hydrothermally treated waste pyrolysis oil, oxygen-containing biological oils having less than 50 mg/kg chlorine and less than 1 mg/kg silicon, and hydrocarbons having less than 50 mg/kg chlorine and less than 1 mg/kg silicon.

20. The method according to claim 19, wherein the hydroprocessing feed consists essentially of a mixture of:
- 1-100 wt % of hydrothermally treated waste pyrolysis oil,
- 0-40 wt % of the oxygen-containing biological oils having less than 50 mg/kg chlorine and less than 1 mg/kg silicon; and
- 0-99 wt % of hydrocarbons having less than 50 mg/kg chlorine and less than 1 mg/kg silicon.

21. The method according to claim 1, wherein the hydroprocessing conditions in step e) comprises a presence of an isomerisation catalyst, the isomerization catalyst including at least one of: a catalyst comprising a Group VIII metal and a molecular sieve on an alumina and/or silica support.

22. The method according to claim 1, wherein in step b) water having a pH above 7 contains one or more cations selected from a list consisting of Li, Na, K, Rb, Cs, Mg, Ca, Sr, and Ba.

23. The method according to claim 16, wherein in step b) water having a pH above 7 contains one or more cations selected from a list consisting of Li, Na, K, Rb, Cs, Mg, Ca, Sr, and Ba.

24. The method according to claim 1, wherein at least 75 wt % of the WPO is comprised of (i) PPO, (ii) TPO, or (iii) a combination of PPO and TPO.

* * * * *